Sept. 14, 1943.　　　　L. DINESEN　　　　2,329,396
INDIVIDUAL VACUUM REGULATOR FOR MILKING MACHINES
Filed Aug. 19, 1938　　　2 Sheets-Sheet 2
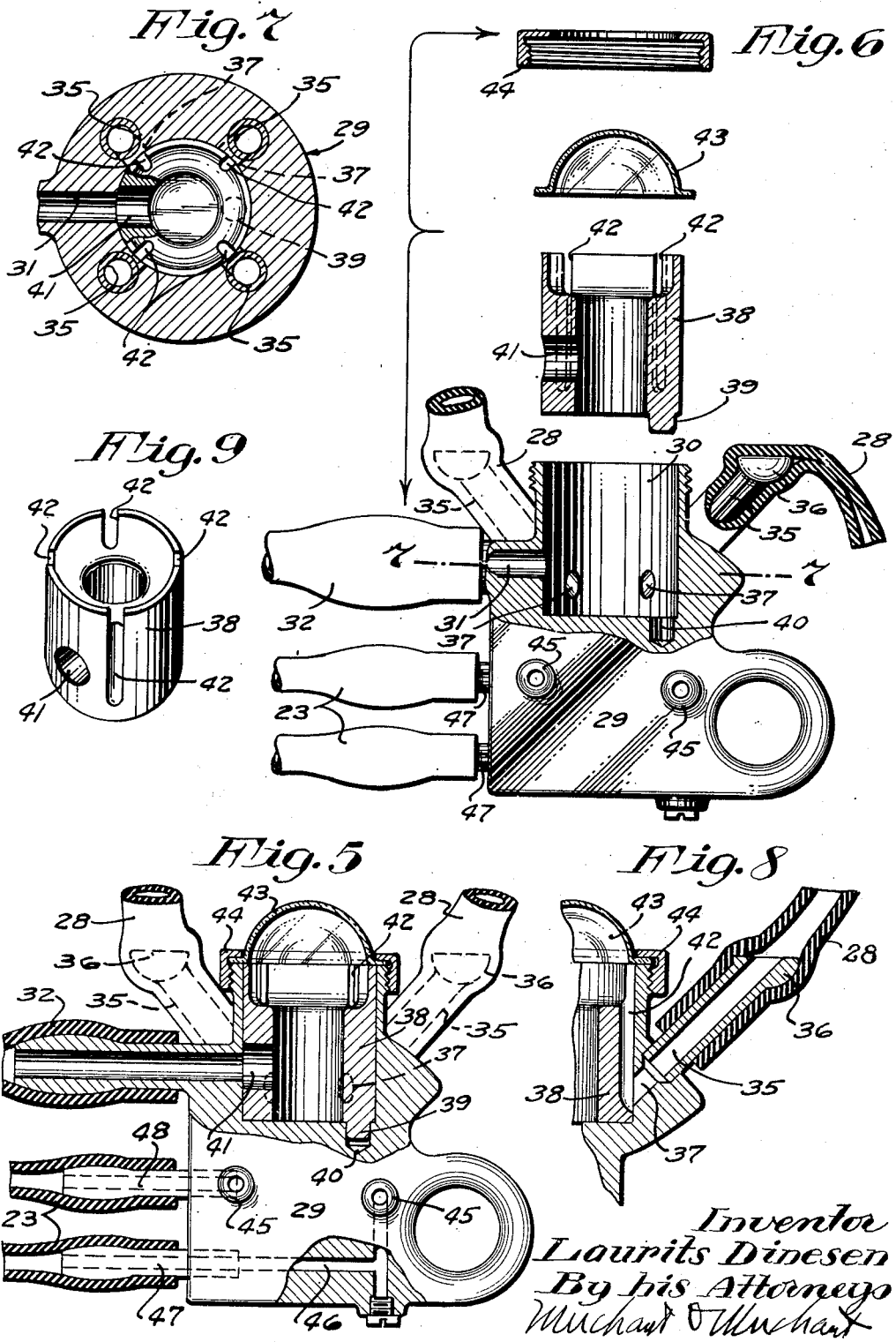

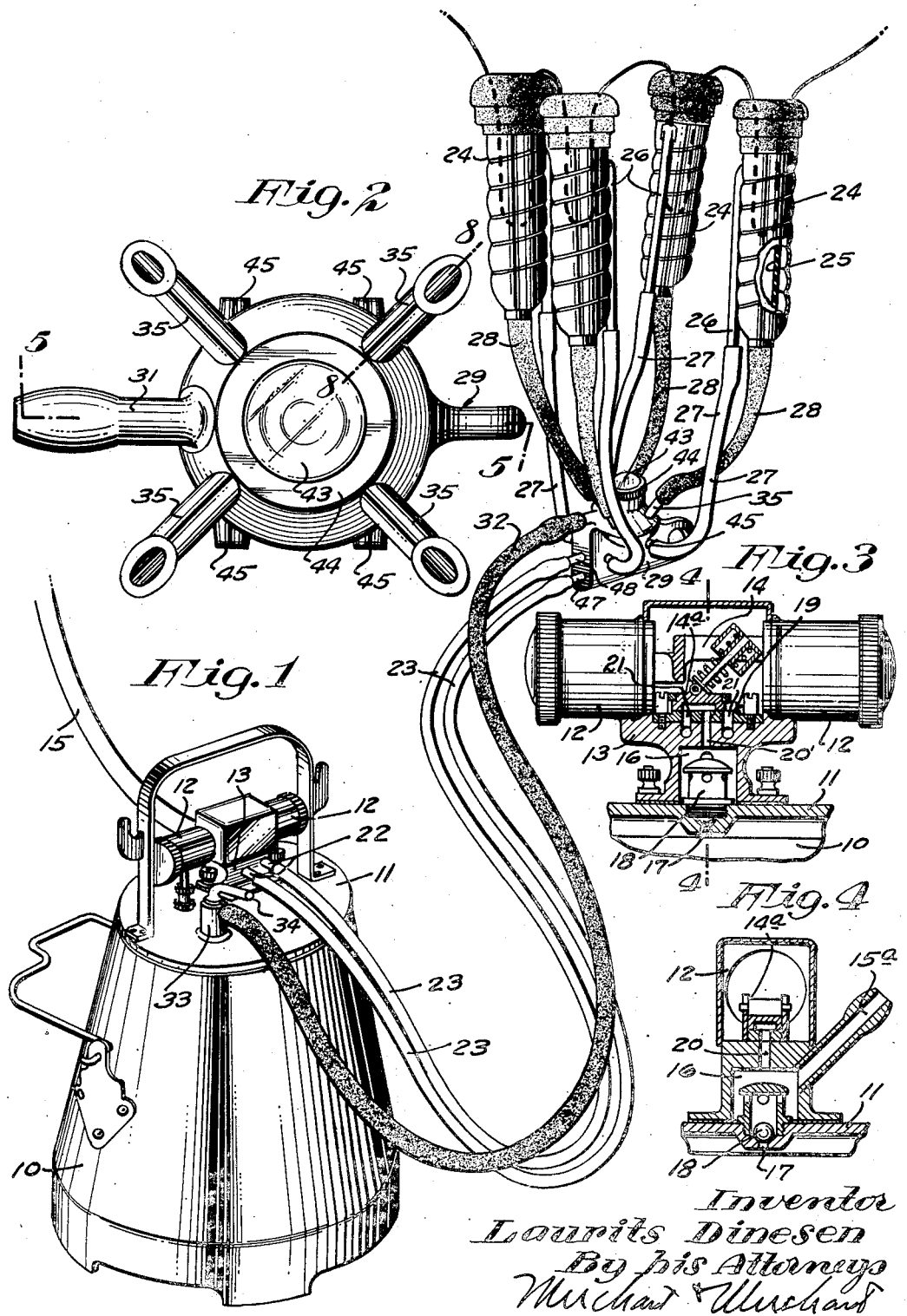

Patented Sept. 14, 1943

2,329,396

UNITED STATES PATENT OFFICE 2,329,396

INDIVIDUAL VACUUM REGULATOR FOR MILKING MACHINES

Laurits Dinesen, Minneapolis, Minn.

Application August 19, 1938, Serial No. 225,764

12 Claims. (Cl. 31—83)

My present invention relates to milking apparatus wherein the milking operation is controlled by a vacuum actuated pulsator.

Milking apparatus of this general character is well known to the trade. In milking machines or apparatus of this type, the pulsator is, in some instances, applied to a teat cup coupler head, but in other instances the pulsator is applied to the top of the milk receptacle, usually designated as the milk can or pail.

In the drawings of this application, the pulsator is applied to the top of the milk can or pail. The pulsator may take various forms but preferably, and as shown, is of the type disclosed and claimed in my prior Patent 1,859,500, of May 24, 1932. The teat cups illustrated may be and as shown are of the type disclosed, for example, in my prior Patent 1,353,570 of September 21, 1920. In the invention as illustrated in the drawings, and as preferably applied, partial vacuum is maintained in the milk can through the vacuum chamber of the pulsator, supplied through a tube or conduit connected to a source of partial vacuum; the milk is drawn to the milk can through a single tube that leads from the teat cup coupler head; the coupler head is connected to a group of four teat cups through flexible tubes; and the four teat cup connections are connected in pairs to opposite sides of the pulsator, through independent flexible air tubes. The arrangement just outlined is a preferred arrangement but is capable of modifications.

The major feature of the present invention is directed to means for independently regulating the partial vacuum or suction rendered effective in the several teat cups, in accordance with the freedom with which the milk flows from the several teats of the cow to which the milk apparatus is applied.

In my experience in the designing, manufacture, sale and uses of milking apparatus, I long ago found that some cows give up their milk more freely than others, and hence, require more or less intense partial vacuum to produce the desirable milking action suitable to the particular cow. A remedy for this effect broadly considered was disclosed and claimed in my prior Patent 1,654,795 of January 3, 1928. More recently I have discovered that, in respect to any particular cow, certain of the teats give up their milk more freely than others, and hence, should be subjected to varying degrees of partial vacuum or suction in the milking operation. My invention is particularly directed to and provides an efficient remedy for the above last noted condition. It involves providing, in the coupler head, a common milk collecting chamber for all of the four teats, and in providing in the independent cup connections, immediately adjacent to or closely associated with the common collecting chamber, a plurality of restricted milk flow or choked passages. For best results these independent restricted passages are arranged to deliver the milk to the common collecting chamber, vertically upward or against the action of gravity. The action of the apparatus designed in accordance with this last noted feature will be made clear after having first described the preferred application of the invention illustrated in the accompanying drawings, wherein like characters indicate like parts throughout the several views.

Referring to the drawings:

Fig. 1 is a perspective showing the milking apparatus;

Fig. 2 is a plan view of the coupler head;

Fig. 3 is a view partly in side elevation and partly in section showing the pulsator and the manner of connection thereof to the milk can;

Fig. 4 is a section taken on the line 4—4 of Fig. 3;

Fig. 5 is a vertical section taken on the line 5—5 of Fig. 2, some parts being broken away and some parts being shown in full;

Fig. 6 is a view corresponding to Fig. 5 but showing the elements of the coupler head segmented or drawn axially apart;

Fig. 7 is a section taken on the line 7—7 of Fig. 6;

Fig. 8 is a fragmentary section taken on the line 8—8 of Fig. 2; and

Fig. 9 is a perspective showing the collecting chamber bushing or flow restricting element removed from the collecting chamber of the coupler head.

The milk receptacle, which is shown in the form of a large can 10, is provided with a cover 11 that is detachably secured to the top of the can with an air tight joint, and in this preferred structure affords a base for the pulsator, which pulsator is preferably of the character above indicated. The exact details of this pulsator are fully described in my above identified Patent No. 1,859,500 and hence may, for the purpose of this case, be briefly described as follows: Axially spaced and axially aligned cylinders 12 are secured to a base bracket 13, which is preferably rigidly but detachably secured to the pail cover 11. Working in the cylinders 12 is a double headed piston 14 that is reciprocated under the action of partial vacuum or suction which, in the present preferred arrangement, is delivered through a tube 15 that is connected to a source of partial vacuum. This tube 15 is shown as directly connected to a nipple 15a that is connected to a chamber 16 formed in the base bracket 13. Chamber 16 is in communication with the interior of the milk can through a port 17 formed in the cover 11. Interposed between the port 17 and the interior of chamber 16 is a check valve 18 that permits air to be drawn from the can, but checks a reverse flow.

In Fig. 3 there is shown a valve seat plate 19 formed with an intermediate port 20 and with spaced ports 21. Port 20 is in communication with chamber 16 through a cooperating port 20', while ports 21 are connected to nipples 22 to which air tubes 23 are connected, see particularly Fig. 1. Working on plate 19 is a slide valve 14a that is reciprocated by piston 14 through connecting means fully disclosed in prior Patent 1,859,500 referred to above. In fact, the pulsator illustrated in part in my present application is assumed to be and preferably is the pulsator of my said Patent 1,859,500.

The teat cups, of which there are four, are of the double-chambered type comprising rigid outer shells 24 and collapsible elastic inner tubes 25. The chambers between the rigid and collapsible shells or elements 24 and 25, are in communication with nipples 26 from which flexible air tubes 27 extend downward to the coupler head, presently to be described. The collapsible inner tubes 25 of the teat cups are connected to or formed as part of flexible milk tubes 28 that are also connected to the coupler head.

The coupler head 29, which is preferably a cast metal structure, involves important novel features already indicated in a general way. It is formed at its upper portion with a collecting chamber 30 preferably cylindrical in form, and provided at one side with a milk discharge passage formed in a nipple-like extension 31. This nipple 31 is connected by a flexible milk tube 32 to a valve casing 33 formed on or applied to the can cover 11 and adapted to be opened and closed at will by an oscillatory valve 34 or the like. Also, the coupler head 29 is formed with four nipples 35, one for each of the four teat cups. These nipples 35 are projected obliquely upward, and, for an important purpose presently to be noted, are terminated at their upper ends in expanded heads 36 that are obliquely cut in respect to the axes of the nipples. The flexible tube-like extensions of the tubes 28 are telescoped over the heads 36 and on to the respective nipples 35. Fig. 6 at the right shows the tubular extension of the teat cup 28 compressed and closed by the weight of the hanging teat cup.

The nipples 35 are shown as directly connected to the interior of the chamber 30 by ports 37. Telescoped into and closely fitting the cylindrical chamber 30 is a bushing 38, which, as shown, is provided with a dowel lug 39 fitting a seat 40 in the bottom of the collecting chamber. This bushing 38 is provided at one side with a large milk discharge port 41 which, by the dowel pin 40, is held in alignment with the passage of the milk discharge nipple 31. In its periphery, the bushing 38 is formed with four vertically extended grooves or flow restricting channels 42 that lead upward from the respective ports 37, and deliver the milk individually to the interior of the collecting chamber 30. The top of the collecting chamber is preferably closed by a dome-like cap 43 that is clamped in place by a nut 44 that has engagement with the top of the cylinder or chamber 30. This dome 43 is of transparent material such as glass or the like. The important action of the flow restricting channels 42 will be later described.

The lower ends of the teat cup air tubes 27 are connected to nipples 45 formed two on each side of the coupler head. Two of the axially aligned oppositely projecting nipples 45 are connected by an air channel 46 formed in the base of the coupler head and connected to a nipple 47 projecting from the coupler head. The other two axially aligned nipples 45 are connected to a nipple 48, also projected from the coupler head. The air tubes 23, at their extended ends, are connected one to the nipple 47 and the other to the nipple 48.

*Operation*

The operation of the apparatus illustrated in the drawings is substantially as follows: Partial vacuum will be maintained in the milk can and the piston of the pulsator will be reciprocated thereby shifting slide valve 14a first in one direction and then in the other so that vacuum will be rendered effective alternately in the air tubes 23, and hence, in the air chambers of the two teat cups on the one side and then in the two teat cups on the other side. The advantage of this alternation of the vacuum or suction actions on the teat cups is, of course, that it always keeps some of the teat cups drawn upward on the teats, and prevents dropping of the group of teat cups.

Under the action of partial vacuum in the milk can, milk will be constantly drawn from the teats (alternately from certain two of the four teats and then from the other two of the four teats); and milk drawn from the teat cups through the tubes 28 will flow through the nipples 35, ports 37 and thence upward through the restricted passages or channels 42 and into the collecting chamber. Here it is important to note that the vertical passages 42, sometimes referred to as choked passages, have much less cross section and conducting capacity than the nipples 35, ports 37 and other parts of the milk delivery conduits. All of these conduits and even the restricted channels 42 are, however, of sufficient cross section and conducting capacity to permit normal flow of the milk from the teats.

If one of the teats gives up the milk very freely, under the partial vacuum or suction produced, the flow of milk will fill up the co-operating restricting channel 42 and that will reduce effective drawing or suction produced on that particular teat, and thus will prevent the teat from being subjected to a stronger pull than is desired.

If, however, the flow from another of the teats is not free and fails to keep the co-operating channel 42 properly supplied with milk, then the vacuum will be rendered more effective on that particular teat and the necessary stronger pull required to give up the milk will be produced.

From this arrangement it further follows that if the particular cow to which the milking apparatus is applied, considering all of the teats, gives up an exceedingly free supply of milk, all of the channels 42 will be solidly filled with milk and the total flow restricting action will reduce or limit the total effective suction or partial vacuum produced on the group of teats. It is important to note that with the construction disclosed and described the flow of the milk from the intake ports of the coupling head through the individual flow-restricting passages 42 will be always in an upward direction, that is, the milk will be taken in from the intake ports at the lower portions of the flow-restricting passages, will be caused to move vertically upward against the action of gravity, and will enter the upper portion of the collecting chamber. This upward flow causes gravity to assist in the resistance to the free flow and, moreover, affords a highly efficient way of connecting all of the streams of milk that enter the collecting chamber.

Attention is now again directed to the construction of the nipples 35 and their heads 36, as best shown in Figs. 5, 6 and 8. Hitherto, nipples and structures of this kind have been extended obliquely and provided with ends cut oblique to their own axes, but in the old arrangement, it was found that when the teat cups were dropped, the sharp edges of the nipples would in time cut the milk tubes. This objectionable feature I have eliminated by providing the nipples with approximately semi-spherical head with the flat surface oblique to the axes of the nipples. This arrangement prevents cutting of the tubes and provides an arrangement wherein the tubes, when a teat cup is dropped, will bend down and close the inlet to the nipple and thus prevent flow of air into the milk passage while the teat cup is dropped. In practice this modified structure of the nipple has been found very important. Moreover, the head on the nipple holds the milk tube on the nipple.

Attention is also further called to the transparent dome 43. When the milk flows into the collecting chamber, it will be delivered upward and more or less against the interior of this transparent dome so that the observer can watch and determine the extent of the flow of milk by viewing the same from any side obliquely downward into the collecting chamber. Hence, this dome-like transparent cover or cap is a decided improvement over the flat transparent disc which requires the observer to look directly downward into the collecting chamber to observe the milk flow.

The drawings of this application illustrate a commercial form and application of the invention, but it will be understood that the same is capable of various modifications as to details of construction and arrangement of parts within the scope of the appended claims.

What I claim is:

1. In a milking apparatus of the kind described, a milk receptacle, a coupling head provided with a common collecting chamber, the lower portion of which is connected to said milk receptacle, said head further having a plurality of intake ports circumferentially spaced around the lower portion of said collecting chamber, and individual flow-restricting channels extended upward from said ports and opening into the upper portion of said common collecting chamber, in combination with teat cups individually connected to said several intake ports.

2. In a milking apparatus of the kind described, a milk receptacle, a coupling head provided with a common collecting chamber, the lower portion of which is connected to said milk receptacle, said head further having a plurality of intake ports circumferentially spaced around the lower portion of said collecting chamber, and individual flow-restricting channels extended upward from said ports and opening into the upper portion of said common collecting chamber, in combination with teat cups individually connected to said several intake ports, and means for producing pressure pulsations in said teat cups and for maintaining partial vacuum in said milk receptacle.

3. In a milking apparatus of the kind described, a milk receptacle, a coupler head provided with a common collecting chamber normally closed at its top by a detachable cap, said collecting chamber including a bushing that is removable therefrom when said cap is removed, the lower portion of the interior of said bushing being connected to said milk receptacle, said coupling head having a plurality of intake ports circumferentially spaced around the lower portion of said collecting chamber, and individual flow-restricting channels extending upward from said intake ports and opening into the upper portion of said collecting chamber, in combination with teat cups individually connected to said several intake ports.

4. In a milking apparatus of the kind described, a milk receptacle, a coupler head provided with a common collecting chamber normally closed at its top by a detachable cap, said collecting chamber including a bushing that is removable therefrom when said cap is removed, the lower portion of the interior of said bushing being connected to said milk receptacle, said coupling head having a plurality of intake ports circumferentially spaced around the lower portion of said collecting chamber, and individual flow-restricting channels extending upward from said intake ports and opening into the upper portion of said collecting chamber, in combination with teat cups individually connected to said several intake ports, and means for producing pressure pulsations in said teat cups and for maintaining partial vacuum in said milk receptacle.

5. The structure defined in claim 3 in which said flow-restricting passages are formed by peripheral longitudinal grooves in said bushing that are closed by the surrounding wall of said collecting chamber.

6. In milking apparatus of the type employing a plurality of test cups, pulsating mechanism and a source of partial vacuum, mechanism for automatically and individually controlling the degree of partial vacuum transmitted to each of said teat cups comprising a member having independent milk connections with said several teat cups respectively, the outlets of said milk connections being circumferentially spaced, said member having a plurality of unobstructed suction control passages materially diminished in cross sectional area relative to said milk connections and each being adapted for communication with one of said milk connections, and a common milk outlet passage centrally disposed of said suction control passages and in communication therewith, said milk outlet passage having communication with the source of partial vacuum.

7. In combination with the several teat cups, milk line and source of partial vacuum of a milking machine, mechanism for automatically and individually controlling the degree of partial vacuum transmitted to each of said teat cups comprising a body having independent milk connections with said several teat cups respectively, said connections terminating in spaced orifices, and means providing a series of unobstructed suction control passages each of said suction control passages being adapted for communication with one of said orifices and being of substantially less cross sectional area than said orifices, said means having a central milk outlet passage in communication with all of said suction control passages, and said milk outlet passage being connected with said milk line which in turn is in communication with a source of partial vacuum.

8. In combination with the several teat cups, milk line and source of partial vacuum of a milking machine, mechanism for automatically and individually controlling the degree of partial vacuum transmitted to each of said teat cups comprising a body having a plug socket therein and having a series of independent milk connections, one connected with each of said teat cups, said connections communicating with said socket, a plug mounted in said socket and having a series of unobstructed suction control passages each being adapted for communication with one of said milk connections, said suction control passages extending from said milk connections upwardly and being of smaller cross sectional area than said milk connections, said plug having an enlarged central milk outlet passage in communication with the upper ends of said several suction control passages, and connections between said milk outlet passage and said milk line which in turn is in communication with a source of partial vacuum.

9. In combination with the several teat cups, pulsator mechanism, milk line and source of partial vacuum of a milking machine, mechanism for automatically and individually controlling the degree of partial vacuum transmitted to each of said teat cups comprising a member having independent milk connections with said several teat cups respectively, said member having a plurality of upwardly extending unobstructed suction control passages corresponding in number to the number of said milk connections and each being adapted for communication with one of said milk connections but being of materially less cross sectional area, and a common milk outlet passage communicating with all of said suction control passages at the upper ends thereof.

10. In milking machines, a claw construction adapted to automatically and individually control the degree of partial vacuum transmitted to each of the teat cups of said machine comprising a body having independent milk passages and connections for each of said several teat cups and having also pulsator connections, said body having a plurality of unobstructed suction control passages of substantially uniform cross sectional area throughout, said passages corresponding in number to the number of said milk connections and each communicating with one of said milk passages but being of materially less cross sectional area, and a common milk outlet passage of substantially greater cross sectional area than said suction control passages in aggregate, said outlet passage communicating with all of said diminished suction control passages and receiving therefrom.

11. In milking machines, a claw construction adapted to automatically and individually control the degree of partial vacuum transmitted to each of the teat cups of said machine comprising a body having independent milk passages and connections for each of said several teat cups and having also pulsator connections, said body having a plurality of diminished unobstructed suction control passages, said passages corresponding in number to the number of said milk connections and each communicating with one of said milk passages and extending upwardly therefrom, and a common milk outlet passage of substantially greater cross sectional area than said several suction control passages in aggregate, said outlet passage communicating with all of said diminished suction control passages at the upper ends thereof.

12. In milking apparatus of the type employing a plurality of teat cups, a milk receptacle, and means for maintaining partial vacuum in said receptacle, mechanism for automatically and individually controlling the degree of partial vacuum transmitted to each of said teat cups comprising, a plurality of unobstructed suction control passages corresponding in number to said teat cups and each having a milk connection at one end thereof with one of said cups and being of substantially uniform cross sectional area throughout but of materially less cross sectional area than said milk connection, said passages extending upwardly from their respective connections with said cups, and means connecting the respective upper ends of said suction control passages with the interior of said milk receptacle.

LAURITS DINESEN.